(12) United States Patent  
De Oliveira Kastrup Pereira et al.

(10) Patent No.: US 7,844,803 B2  
(45) Date of Patent: Nov. 30, 2010

(54) CONFIGURABLE DATA PROCESSING DEVICE WITH BIT REORDERING ON INPUTS AND OUTPUTS OF CONFIGURABLE LOGIC FUNCTION BLOCKS

(75) Inventors: Bernardo De Oliveira Kastrup Pereira, Eindhoven (NL); Jan Hoogerbrugge, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 617 days.

(21) Appl. No.: 10/023,117

(22) Filed: Dec. 17, 2001

(65) Prior Publication Data

US 2002/0083308 A1 Jun. 27, 2002

(30) Foreign Application Priority Data

Dec. 20, 2000 (EP) ................................. 00204650

(51) Int. Cl.  
*G06F 9/30* (2006.01)
(52) U.S. Cl. .................... 712/226; 712/209; 712/227
(58) Field of Classification Search ................ 712/209, 712/226, 227  
See application file for complete search history.

(56) References Cited

U.S. PATENT DOCUMENTS

| 4,346,438 | A | * | 8/1982 | Potash et al. ................ 712/209 |
| 5,321,845 | A | * | 6/1994 | Sawase et al. ................. 712/37 |
| 6,006,321 | A | * | 12/1999 | Abbott ........................ 712/43 |
| 6,023,564 | A | * | 2/2000 | Trimberger .................. 703/23 |

FOREIGN PATENT DOCUMENTS

| WO | 9857252 A1 | 12/1998 |
| WO | 0017771 A2 | 3/2000 |
| WO | 0049496 A1 | 8/2000 |

OTHER PUBLICATIONS

Hauck, Scott, Fry, Thomas W., Hosler, Matthew M., Kao, Jeffrey P., The Chimaera Reconfigurable Functional Unit, The 5th Annual IEEE Symposium on FPGAs for Custom Computing Machines, Apr. 16-18, 1997.*

Hutchings, Brad L., Wirthlin, Michael J., Implementation Approaches for Reconfigurable Logic Applications, Proceedings of the 5th International Workshop on Field Programmable Logic and Applications, Ocford, UK, Aug. 29-Sep. 1, 1995.*

Razdan, Rahul, Smith, Michael D., A High-Performance Microarchitecture with Hardware-Programmable Functional Units, Proceedings of the 27th Annual International Symposium on Microarchitecture, Nov. 30-Dec. 2, 1994.*

DeHon, Andre, Transit Note #118 Notes on Coupling Processors with Reconfigurable Logic, M.I.T. Transit Project, Mar. 21, 1995, pp. 1-40.*

Yahoo! Education, Dictionary definition of "directly", accessed from http://education.yahoo.com/reference/dictionary/entry/directly.*

* cited by examiner

*Primary Examiner*—Richard Ellis

(57) ABSTRACT

A data processing device has a configurable functional unit for executing an instruction according to a configurable function. The configurable functional unit has a plurality of independent configurable logic blocks for performing programmable logic operations to implement the configurable function. Configurable connection circuits are provided between the configurable logic blocks and both the inputs and the outputs of the configurable functional unit. This allows an optimization of the distribution of logic functions over the configurable logic blocks.

16 Claims, 3 Drawing Sheets

Figure 1:
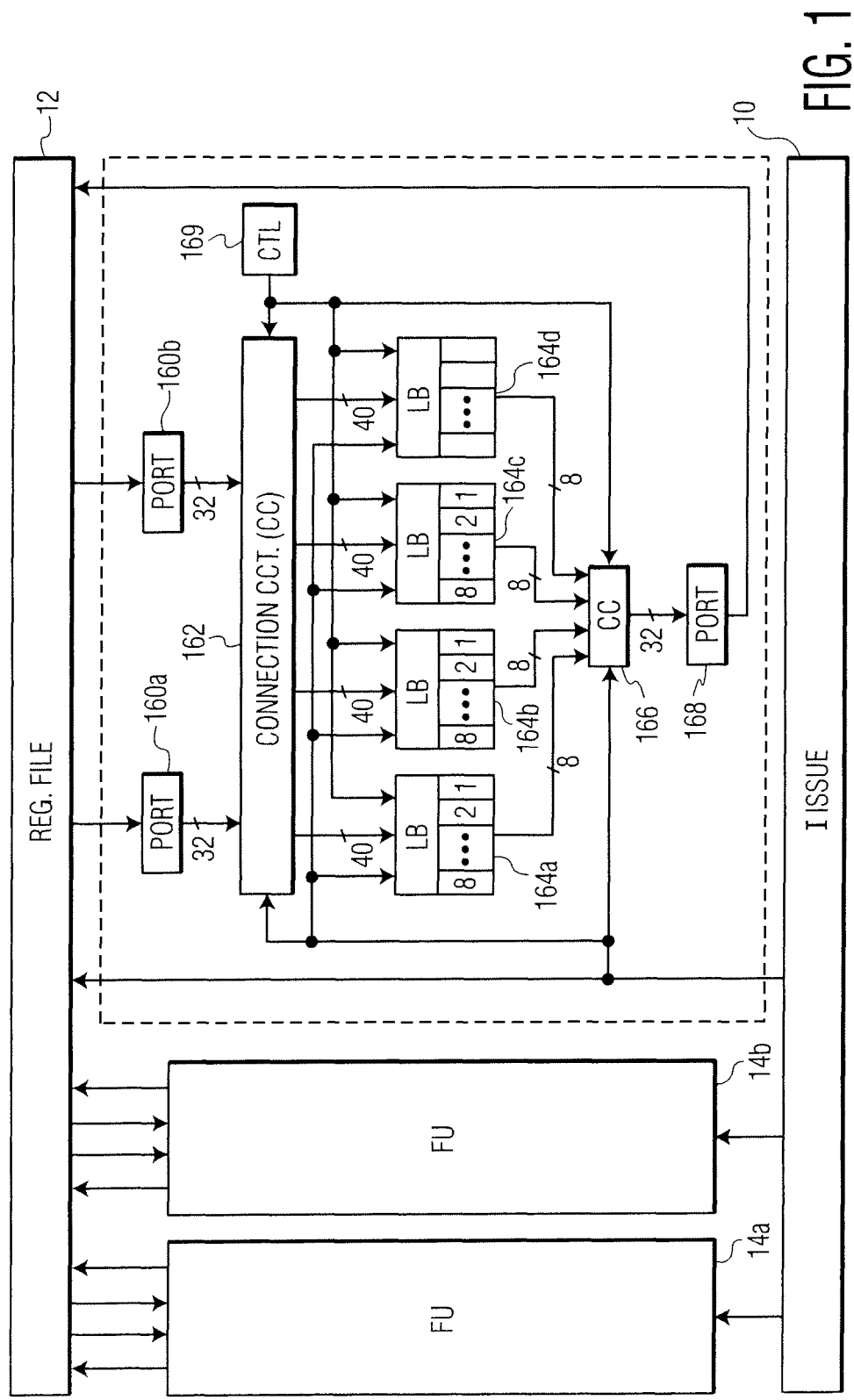

CONFIGURABLE DATA PROCESSING DEVICE WITH BIT REORDERING ON INPUTS AND OUTPUTS OF CONFIGURABLE LOGIC FUNCTION BLOCKS

The field of the invention is a data processing device with a configurable functional unit.

Conventional processing devices have a predetermined instruction set that comprises general purpose instructions like "ADD", "LOAD", "AND", "SHIFT" etc. for performing general purpose operations on operands specified in these instructions. Generally speaking, any processing task can be implemented using such general purpose instructions. One or more general purpose functional units provide for the execution of such general-purpose instructions.

A data processing device with a configurable functional unit is known from PCT patent application WO 00/49496 (by the same assignee (assignee reference PHN 17306)). A configurable functional unit provides for special, "configurable" instructions that cause the processing device to perform some special purpose operation on an operand. The special purpose operation is defined specifically for a program or set of programs that have to be executed. The special purpose operation is selected to optimize execution of a processing task or processing tasks. The programmer (or a compiler) identifies a complex of operations that has to be executed repeatedly to perform this processing task or tasks and which would cost a considerable amount of time or resources to implement in a program with general purpose instructions. A configuration is then designed that causes the configurable functional unit to execute this complex of operations when it encounters a special instruction. The configurable functional unit is configured accordingly and a program is generated that contains the special instructions at those points where the complex of operations is to be executed.

The configurable functional unit is implemented using for example a set of programmable logic blocks, containing for example first level logic gate circuits with logic gate inputs connected to each of a number of inputs for different bits of the operand of the special instruction. The connections between the bits and the inputs of the logic gate can be activated or de-activated by means during configuration. Similarly, the logic block may contain a second and further level logic gates that have inputs connected to outputs of lower level logic gates. The connections between these inputs and outputs can also be activated or deactivated during configuration. As a result, when the specific instruction is executed, the logic gates operate using selected ones of the bits of the operand of the instruction.

A set of several independent programmable logic blocks is used in the configurable functional unit to configure operations performed in response to the specific instruction, rather than a single, large many input-output programmable logic block. The combined complexity of several reduced input/output, independent logic blocks is smaller than that of a large programmable logic block.

The bits from the operand of the specific instructions are routed to the inputs of the various programmable logic blocks. The outputs of the programmable logic blocks are connected to the various bits of the output of the configurable unit that produces the result of the specific instruction. The bits of the operand of the specific instruction are routed to the appropriate programmable logic blocks to ensure that the appropriate bits of the operand are supplied to those programmable logic blocks that produce result bits that depend on those bits of the operands.

For this purpose, the configurable functional unit contains a programmable connection circuit between the operand input of the functional unit and the programmable logic blocks. During configuration this programmable connection circuit is configured so that it provides the connections required by the configured operation.

A programmable logic block of given complexity can only implement operations up to a certain level of complexity. This limits the complexity of the operations that the configurable functional unit can be configured to execute.

Amongst others, it is an object of the invention to provide for a data processing device with a configurable functional unit that is able to implement operations with greater complexity, given programmable logic blocks of a give complexity.

A data processing device according to the invention is set forth in claim 1. According to the invention, a second connection circuit is provided between the outputs of the programmable logic blocks and the outputs of the functional units that output the result of the specific instruction. Thus, there are connection circuits at two locations, both in front of the programmable logic blocks and at the back of the programmable logic blocks. At first sight, this would appear to be redundant, for if any bit of the operand can be routed to any programmable logic block then this bit can simply be routed to any programmable logic block that produce a specific bit of the result of the instruction. There seems to be no need to reroute the output of the programmable logic block yet once more.

However, a fixed routing of the outputs of the programmable logic blocks limits the maximum complexity of the operations that can be implemented. Suppose a first set of bits of the result of the specific instruction each requires a large complexity in the programmable logic blocks and a second set of bits each requires little complexity. If the first set of bits has to be produced by a first programmable logic block and the second set has to be produced by a second programmable logic block, then the first programmable logic block might have insufficient capacity at a time when the second programmable logic block is underutilized. By configuring the connection between the outputs of the programmable logic blocks and the outputs for the result of the configurable functional unit, it is made possible that the computation of the bits of the result of the instruction can be distributed over the various programmable logic blocks so as to balance the complexity of the operations for which of the functional units need to be configured. Thus, a more complex combination of operations for different result bits can be implemented than in a processor where there is a fixed connection between result bits and outputs of the programmable logic blocks.

In principle, a full connection network may be provided that is able to connect any one of the outputs of the programmable logic blocks to any one of the bits of the result. However, in an embodiment, each bit of the result is associated with one bit of the outputs of each respective programmable logic block. The connection circuit contains a multiplexer for the bit, which has inputs connected to the one bit of each of the programmable logic blocks. The connection made by the multiplexer is configurable. When a programmable logic block produces a particular bit of the result, the programmable logic block is configured so that the logic circuits that produce the bit are the circuits connected to the output that is connected to the multiplexer for the particular bit. Thus, any required connection can be realized with only limited overhead for the connection circuit between the programmable logic blocks and the output of the functional unit.

Figure 2:
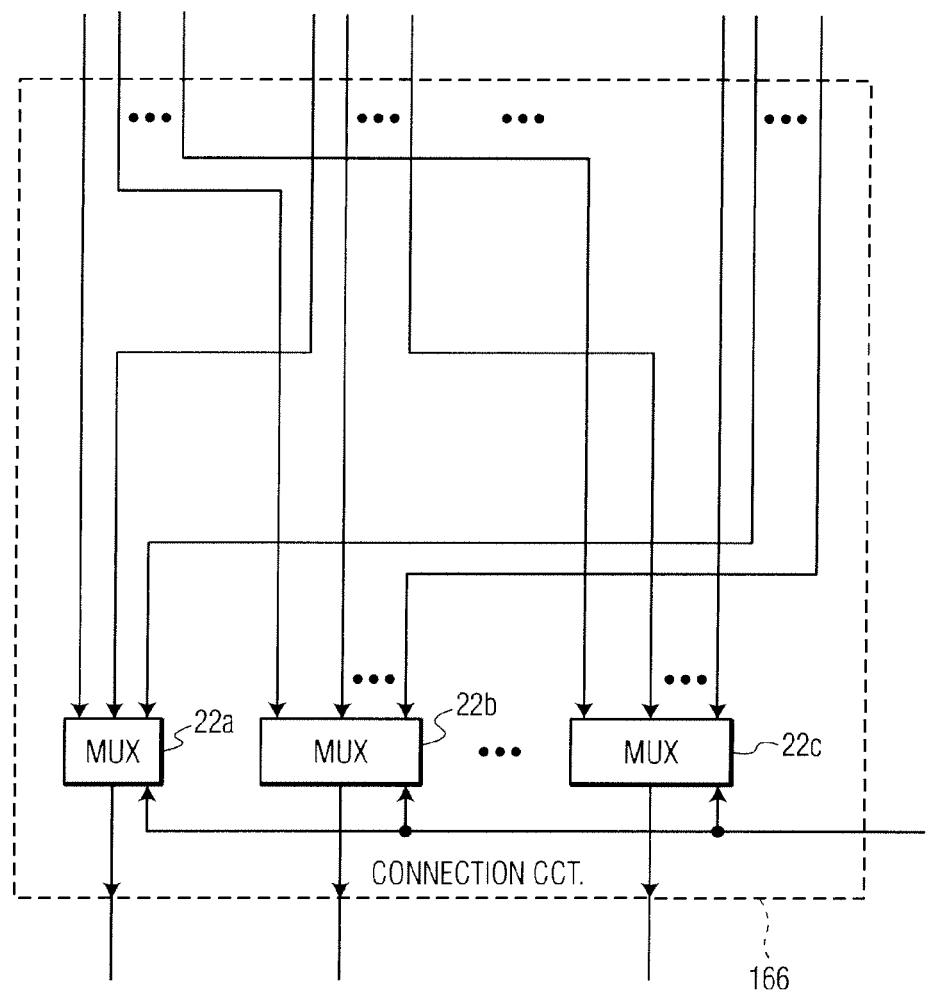
Figure 3:
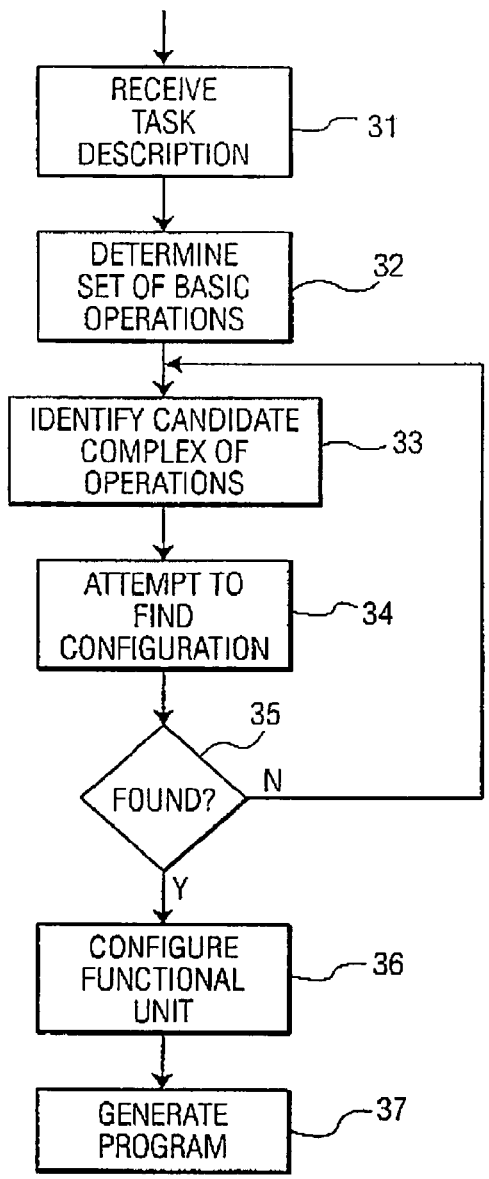

These and other advantageous aspects of the data processing device according to the invention will be described in more detail using the following figures of which FIG. 1 shows a data processing device FIG. 2 shows a connection circuit FIG. 3 shows a flow-chart for configuring and programming a data processing device.

FIG. 1 shows a processing device. The device contains an instruction issue unit 10, a register file 12, functional units 14a, b and configurable functional unit 16. The instruction issue unit 10 has outputs connected to the functional units 14a, b and 16. The functional units 14a, b, 16 have ports connected to read and write ports of the register file 12.

Two functional units 14a,b, shown by way of example, are standard non-configurable functional units 14a,b such as an ALU (arithmetic-logic unit), or a memory load store unit etc. Functional unit 16 is a configurable functional unit. The processing device may contain more of such configurable functional unit 16, which is capable of receiving the instructions and performing operations on operands from register file 12, but by way of example only one configurable functional unit 16 is shown.

The configurable functional unit 16 contains a first and second input port 160a, b, a first connection circuit 162, four programmable logic blocks 164a-d, a second connection circuit 166, an output port 168 and a configuration control unit 169. The input ports 160a, b interconnect read ports of the register file 12 and, via the first connection circuit 162, the programmable logic blocks 164a-d. The output port 168 interconnects a write port of the register file 12 and, via the second connection circuit 166, the programmable logic blocks 164a-d. The configuration control circuit 169 has configuration control outputs coupled to a first connection circuit 162, programmable logic blocks 164a-d and second connection circuit 166.

In operation, instruction issue unit 10 issues successive instructions to the functional units 14a,b, 16. (For this purpose, instruction issue unit 10 may contain for example an instruction memory, an instruction cache, a program counter, a branch unit etc. not shown in FIG. 1). The instructions may be issued in parallel to the functional units 14a,b 16, for example in case of a VLIW or superscalar type of architecture or in series, in which case instruction issue unit 10 selects which of the functional units 14a,b, 16 has to execute the instructions. Functional units 14a,b, 16 pass operand and result register selection codes from the instructions to the their ports to register file 12 (the ports may be shared among a set of different functional units 14a,b 16, as long as only one of the set accesses the register file 12 at a time). Functional units 14ab, 16 execute the instructions that they are ordered to execute by the instruction issue unit 10, using operands from the register file 12 as addressed by the instructions and writing results to the register file 12 as specified in the instructions.

The way configurable functional unit 16 executes instructions depends on configuration data supplied by configuration control circuit 169. This configuration data may be loaded into configuration control circuit 169 via a load connection (not shown) for example under control of special configuration data load instructions from instruction issue unit 10, or via a scan chain etc.

First connection circuit 162 passes bits from the operands at input ports 160a, b to selected ones of the inputs of programmable logic blocks 164a-d. Selection is under control of the configuration control circuit. In principle any bit may be passed to any input of any programmable logic block 164a-d.

Programmable logic blocks may have a structure which is known per se for conventional programmable logic devices such as PLD's PLA's etc. Programmable logic blocks 164a-d perform logic operations on the bits of the operands. These logic operations may include a logic (N)OR of the signals at their inputs, a logic (N)AND, an exclusive OR etc. The results of these operations may again be subjected to similar logic operations in the programmable logic blocks 164a-d. These logic operations are performed for example by logic gates with connections to the inputs of the programmable logic blocks 164a-d, or to other logic gates in the programmable logic blocks 164a-d. These connections are activated or de-activated under control of configuration control circuit 169. When the configurable functional unit 16 executes an instruction, bit signals from the operands flow through the connections and the logic gates as configured through configuration control circuit 169.

Preferably, programmable logic blocks 164a-d are symmetric with respect to their outputs. That is, they are laid out so that if a logic relation can be realized that makes the signal at a first output depend in a certain way on signals at a first set of inputs, then it is also possible to make other outputs depend in that way on the signals at the first set of inputs. This provides for a powerful design freedom to map logic functions onto the programmable logic blocks 164a-d. Thus, it is easier to distribute the programmable logic that is needed to realize different bits in the result over different programmable logic blocks 164a-d if that is needed to make effective use of the programmable logic blocks 164a-d. Preferably, the programmable logic blocks 164a-d are also symmetric at least with respect to groups of their outputs, in the sense that if a certain logic relation can be realized as a function of an input signal from a group of inputs, then the same logic relation can be realized as a function of the input signal from other inputs in that group. This also provides mapping freedom.

Second connection circuit 166 passes signals from the outputs of programmable logic blocks 164a-d to selected ones of the bits in the result produced at the output port 168 of the configurable functional unit 16. The bit in the result to which an output of functional logic block 164a-d is connected is selected under control of configuration control circuit 169. This is independently configurable at the level of individual bits. Output port 168 passes the bits of the result to a write port of the register file 12, where the result is stored in a register indicated by the instruction, for later use as an operand during execution of another instruction by a functional unit 14a, b, 16.

Without deviating from the invention, additional programmable logic (not shown) may be added between the second connection circuit 166 and the output port, to form the bits of the result form logic function combinations of the outputs of programmable logic blocks 164a-d.

FIG. 2 shows a connection circuit 20 for use as second connection circuit 166 in the configurable functional unit of FIG. 1. The connection circuit 20 comprises a number of multiplexers 22a-c, each with a bit output coupled to a different bit in the result that is passed to the register file 12. The multiplexers 22a-c have inputs coupled to the outputs of programmable logic blocks 164a-d. Each multiplexer 22a-c operates under control of configuration data from configuration control circuit 169 (not shown in FIG. 2), to route a signal from a selected one of its inputs to its output.

In this embodiment, each multiplexer is coupled to only one output from each functional logic block 164a-d. For example, a first output of each programmable logic block 164a-d is coupled to a first one of the multiplexers 164a, a second output of each programmable logic block 164a-d is coupled to a second one of the multiplexers 164b and so on. This reduces the amount of hardware needed for the connection circuit 20. When the configurable functional unit 16 is configured to perform a specific instruction, and a bit in the result has to depend on the bits in the operands according to a certain logic function, the programmable logic blocks 164a-d are configured so that the logic function is performed to produce a signal at an output that is connected to a multiplexer 164a-c which is connected to this bit in the result.

Other ways of connecting the outputs of the programmable logic blocks 164a-d to bits of the result can also be used, for example, using fixed connections between part of the outputs and part of the result bits and more fully configurable connections between the remainder of the outputs and the remainder of the result bits. The first connection circuit 162 and the programmable logic blocks 164a-d are then configured so that the required logic for result bits with fixed connections to outputs is configured in programmable logic gates that are connected to these outputs. The remainder of the logic, for other result bits, is distributed over the remaining programmable logic in the blocks 164a-d, leading to output of the result bits at outputs of the programmable logic blocks 164a-d that are connected to the appropriate result bits in via the connection circuit 166.

In each of these examples, a second connection circuit 166 with restricted routing capability can be used, because the flexibility of distribution of the configuration over the programmable logic blocks 164a-d and the first connection circuit 162 makes it possible to route the result bits to outputs of the programmable logic blocks 164a-d that can be connected to the appropriate result bits. The restrictions in routing capability reduce the required amount of circuitry and the delay of the second connection circuit 166. Similarly, the routing capability of the first connection circuit 162 may be reduced.

For maximum programmability either the first connection circuit 162 or the second connection circuit 166 preferably has a fixed routing to one input or output of the one of the functional blocks 164a-d, the other inputs and output being arbitrarily routable to the operand inputs and the result outputs.

FIG. 3 shows a flow chart of a method of configuring a configurable functional unit. Preferably this method is executed by a host computer that generates a program for the data processing device of FIG. 1. In a first step 31 the host computer receives a description of a processing task that has to be performed by the data processing device. This description can be in the form of a program in a high level programming language, like the "C" language.

In a second step 32 the host computer determines a set of basic operations that has to be performed for implementing the processing task. This can be done for example by compilation of the program in the high level language. In principle each basic operation can be mapped to one or more machine instructions that can be executed by general purpose functional units 14a, b.

In a third step 33 the host computer identifies a candidate complex of operations that lends itself to implementation as an instruction to be executed by configurable functional unit 16. The word "complex" as used here refers to a plurality of operations and their mutual dependency through the use of results of one operation as operand for another operation. Such identification is known per se for known computers with configurable functional units. It can be realized for example by representing the programming task as a flow graph, in which nodes represent operations (possibly at a bit level) and links represent dependencies. A complex is a subgraph of this flow graph. By means of a profile of execution of the task one can identify subgraphs with a limited number of inputs and outputs that are executed often, or which occur at many locations in the program. Such subgraphs represent complexes of operations that are candidates for special instructions.

In a fourth step 34 the host computer attempts to find a configuration for the configurable functional units. That is, it attempts to find a configuration for the first connection circuit 162, the programmable function blocks 164a-d and the second connection circuit 166, so that the relation between the operands at the input ports 160a, b and the result at the output port 168 is as required for the candidate. In principle, the host computer has to map logical operations to different logic circuits in the programmable logic blocks 164a-d for the computation of each of the bits of the result. Different mappings, in which a logic operation is mapped to different logic circuits are possible. The host computer attempts to find such a mapping that all bits of the result can be computed with the logic circuits available in the programmable logic blocks.

According to the invention, the host computer considers mapping the logic operations for a bit of the result to different ones of the programmable logic blocks 164a-d. This is done for example by first generating an assignment of result bits to programmable logic blocks 164a-d. Subsequently, for each programmable logic block 164a-d, the host computer assigns logic circuits to the logical operations required for the bits of the result assigned to that block 164a-b. This is done for one bit of the result after another. If it is possible to assign logic circuits for all result bits, the mapping succeeds. If not, because insufficient logic circuits are left in the programmable logic block 164a-b before the logic functions for all result bits have been implemented, the mapping fails and the host computer tries another assignment of result bits to programmable logic blocks 164a-d. Thus the host computer tries all possible assignments of result bits to logic blocks until the mapping succeeds or until all assignments fail, in which case the host computer cannot find a configuration.

As a result of the selection of the assignment of result bits to various programmable logic blocks 164a-d, it follows how the second connection circuit 166 should be configured to route the bits from the programmable logic blocks 164a-d to the output port. Similarly, it follows from the assignment of logic circuits how the first connection circuit must be configured to route bits of the operands from the input ports 160a, b to the programmable logic blocks 164a-d.

In a fifth step 35 the host computer detects whether it has been impossible to find a configuration. If so, the method returns to the third step 33 and another candidate complex of operations is selected. If it was possible to find a configuration that implements the candidate complex of operations, the host computer may also return to the third step to find other configurable candidates, in order to select a most effective candidate later on. In any case, the method proceeds to a sixth step 36 if at least one configurable candidate has been found.

In the sixth step 36, the configurable functional unit is configured according to the candidate found in the preceding steps. This means that the programmable logic blocks 164a-d and the connection circuits 162, 166 are configured as selected in the fourth step.

In a seventh step a program of instructions for the functional units 14a, b, 16 is generated that implements the processing task. In the program the complex of operations that has been selected in the third step 33 is replaced by a special instruction that causes configurable functional unit 16 to execute the complex of operations. This program is downloaded into instruction issue unit 10 for execution.

Of course, the skilled person will appreciate that various deviations from the flow chart of FIG. 3 are possible. For example, the candidate complex of operations may be selected for a set of programs rather than for a single program.

In another example the configuration selection step 34 may have to account for various hardware constraints. The program with the special instruction may be generated before configuring the configurable functional unit 16. Configuration may be permanent, performed during manufacture of the processing device, or task dependent, performed each time before a task is executed or even during execution of a task, between execution of different parts of a task that profit from different configurable instructions. In an embodiment of the configurable functional unit, at least the programmable logic blocks 164*a-d* also receive opcode information from the instruction issue unit 10. In this case, the output signal of the programmable logic blocks 164*a-d* can be made to depend on the opcode, which makes it possible to implement more than one configurable instruction with the same configuration. Thus, effectively, there are several configurable instructions, the opcode of the different instructions signaling the configurable functional unit which of the configurable instructions should be executed.

The invention claimed is:

1. A data processing device configured according to a device configuration so as to be capable of executing a program comprising an instruction, the device comprising
a configurable functional unit for executing the instruction according to a configurable function that is configured outside the instruction, the configured function including an input ordering instruction, a configured logic function, and an output ordering instruction,
the configurable functional unit including:
a unit input for inputting a plurality of input bits of one or more source registers specified by the instruction,
a unit output for outputting a plurality of output bits to a destination register specified by the instruction,
a first programmable connection circuit that is configured to receive the plurality of input bits and selectively route the input bits to provide a set of logic input bits, based on the input ordering instruction,
a plurality of independent configurable logic blocks for performing programmable logic operations to produce a set of logic output bits corresponding to the configured logic function being applied to the set of logic input bits,
a second programmable connection circuit that is configured to receive the set of logic output bits and selectively route the logic output bits to provide the plurality of output bits that are directly output to the destination register, based on the output ordering instruction.

2. The data processing device of claim 1, each logic block having a plurality of outputs, at least one of the output bits of the unit output being connectable exclusively to one of the outputs of each logic block, the second programmable connection circuit comprising a multiplexer for coupling the one of the outputs of a selected one of the logic blocks to the at least one of the output bits of the unit output.

3. The data processing device of claim 1, each logic bock having a plurality of outputs, each of the output bits of the unit output being connectable exclusively to a respective one of the outputs of each logic block, the second programmable connection circuit comprising a respective multiplexer for each particular bit of the unit output, for coupling the respective one of the outputs of a selected one of the logic blocks to the particular output bit of the unit output.

4. The data processing device of claim 1, either the first programmable connection circuit or the second programmable connection circuit having a fixed, unprogrammable connection to an input or output of one of the independent configurable logic blocks and a programmable connection to a remainder of the inputs and outputs.

5. A method of programming a configurable processing device according to a device configuration to perform a processing task, wherein the device includes a configurable processing unit that includes one or more programmable logic blocks, the method comprising:
identifying a special complex of operations that occurs in the task and requires one or more operand data words and produces a result data word;
searching for an assignment of logic operations for producing different bits of the result data word to different ones of the programmable logic blocks, so that the logic operations for producing a subset of the bits of the result data word that, if implemented together in one of the programmable logic blocks, would exceed the capacity of that one of the programmable logic blocks, are distributed over different ones of the logic blocks;
programming each of the programmable logic blocks to perform the logic operations for the bits of the result data word assigned to it;
programming a first connection circuit to the programmable logic blocks so as to perform a first routing of bits of an operand of a special instruction to the programmable logic blocks that use those bits of the operand in the logic operations; and
programming a second connection circuit subsequent to the logic blocks so as to perform a second routing of outputs of the programmable logic blocks to bits of the result data word that are directly output to a destination register, to which the programmable logic blocks are assigned.

6. A method of executing a program with a processing device with a configurable functional unit according to a device configuration, the method comprising:
inputting one or more words of one or more operands of a program instruction into the configurable functional unit, each word including a plurality of bits;
selectively coupling the bits of the words of the operands to inputs of logic blocks, dependent on a configured function of the configurable functional unit;
performing programmable logic operations to implement the configured function to provide an output word that includes a plurality of bits;
selectively coupling bits of the output word to bits of a result word, dependent on the configured function; and
outputting the result word directly to a destination register identified in the program instruction.

7. A data processing device comprising:
a register file that includes a plurality of registers, each register including a word, each word including a plurality of bits in a first bit order, and
at least one configurable function units that is dynamically configurable to effect different functions at different times, based on received configuration data, the at least one configurable function unit including:
a first connection circuit that is configured to receive one or more words from the plurality of registers, and to provide one or more words of bits in a second bit order based on the received configuration data,
one or more programmable logic blocks that are configured to receive the one or more words in the second bit order from the first connection circuit, and to provide an output word of bits in a first output bit order based on the received configuration data,
a second connection circuit that is configured to receive the output word and to provide therefrom a word of bits in a second output bit order that is directly output to a destination register of the plurality of registers based on the received configuration data.

8. The data processing device of claim 7, including an input unit that is configured to receive the one or more words from the plurality of registers, and to provide the one or more words to the first connection circuit.

9. The data processing device of claim 7, wherein source registers of the one or more words from the plurality of registers are identified in an instruction that effects execution of a current function of the at least one configurable function unit.

10. The data processing device of claim 7, wherein the destination register is identified in the instruction.

11. A device comprising:
a processor that is configured to execute instructions that identify: an operation, one or more source registers, and a destination register, each register including a word that includes a plurality of bits, the processor including:
  a first connection circuit that receives a word from a source register of the one or more source registers and provides an operand word that includes a plurality of bits that are arranged in a bit order based on a programmed set of configuration data corresponding to the operation,
  a configurable function circuit that provides a result word based on the operand word and the programmed set of configuration data,
  a second connection circuit that receives the result word and directly provides an output word for storing in the destination register that includes a plurality of bits that are arranged in a bit order based on the programmed set of configuration data.

12. The device of claim 11, wherein the processor includes an input port that is configured to receive the word from the source register, and to provide the word to the first connection circuit.

13. The device of claim 11, wherein the processor includes one or more other function circuits that are configured to receive one or more words from the plurality of registers and provide one or more other result words to the plurality of registers.

14. The device of claim 11, including an instruction issue unit that is configured to provide the instructions to the processor.

15. The device of claim 14, including a configuration control circuit that is configured to provide the set of configuration data corresponding to the operand based on a configuration instruction from the instruction issue unit.

16. The device of claim 11, including a configuration control circuit that is configured to provide the set of configuration data corresponding to the operand.

* * * * *